(12) United States Patent
Fawcett et al.

(10) Patent No.: US 6,320,436 B1
(45) Date of Patent: Nov. 20, 2001

(54) CLOCK SKEW REMOVAL APPARATUS

(75) Inventors: Adrian Fawcett, Torfaen; Jeremy Whaley, Yate, both of (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 0 days.

(21) Appl. No.: 09/491,928

(22) Filed: Jan. 27, 2000

(30) Foreign Application Priority Data

Feb. 18, 1999 (GB) .................................................. 9903769

(51) Int. Cl.⁷ .................................................. H03L 7/06
(52) U.S. Cl. ..................... 327/158; 327/159; 327/161; 327/271; 375/373; 331/DIG. 2
(58) Field of Search ..................... 327/141, 144, 327/146, 147, 149, 150–153, 155, 158–161, 166, 269, 271; 375/371–376; 331/1 A, DIG. 2, 17, 34, 57; 365/233, 233.5

(56) References Cited

U.S. PATENT DOCUMENTS

| | | | |
|---|---|---|---|
| 4,600,943 | * 7/1986 | Tanabe .................................. | 348/464 |
| 4,755,704 | 7/1988 | Flora et al. ........................... | 327/152 |
| 5,006,979 | 4/1991 | Yoshie et al. ......................... | 709/400 |
| 5,218,314 | 6/1993 | Efendovich et al. ................. | 327/152 |
| 5,790,611 | 8/1998 | Huang et al. ......................... | 375/371 |

FOREIGN PATENT DOCUMENTS

| | | |
|---|---|---|
| 0 140 042 | 5/1985 | (EP) . |
| 0 329 418 | 8/1989 | (EP) . |
| 0 445 574 | 9/1991 | (EP) . |
| 0 473 903 | 3/1992 | (EP) . |
| 2 071 943 | 9/1981 | (GB) . |
| 2 317 282 | 3/1998 | (GB) . |

* cited by examiner

*Primary Examiner*—Tuan T. Lam
*Assistant Examiner*—Minh Nguyen
(74) *Attorney, Agent, or Firm*—Wolf, Greenfield & Sacks, P.C.; James H. Morris

(57) ABSTRACT

Digital clock deskew apparatus for synchronising the phase of a first and a second clock signal. The deskew apparatus includes a tapped delay line, selector apparatus and a phase detector.

16 Claims, 6 Drawing Sheets

CLOCK SKEW REMOVAL APPARATUS

FIELD OF THE INVENTION

The present invention relates to circuitry for synchronising clock signals and in particular to a self-adjusting delay line which provides a balancing delay in one clock signal to match an unknown delay in the other signal so that the first and second clock signals can be synchronised and thereby the skew between the two signals may preferably be removed.

As the clock speed for integrated circuits increases, external interfaces are becoming proportionally slower compared to the internal circuitry, and synchronisation of interfaces with internal logic becomes more critical.

Clock skew removal techniques are necessary in applications such as frame buffer interfaces because memory timing requirements cannot be guaranteed to be met under all conditions and across process corners if fixed delays are used.

In the past the most common approach to clock deskew has been to use a phase locked loop (PLL). This is a different type of circuit to a self-adjusting delay line and achieves phase alignment by frequency adjustment of a voltage controlled oscillator. A PLL also needs to detect frequency differences in addition to phase differences.

However use of a PLL to effect skew removal has three main drawbacks. Firstly the provision of a PLL has special requirements regarding layout of the circuitry since the PLL is large. Secondly if the clock frequency changes suddenly it will not deskew correctly whilst it settles and may even output a different number of clock pulses during that period. Thirdly, it is difficult to write a functional model of a PLL which is cycle-accurate in system simulations.

It is therefore an object of the present invention to at least partly mitigate the above problems.

SUMMARY OF THE INVENTION

According to the present invention there is provided a digital clock deskew apparatus for synchronising the phase of a first clock signal, with the phase of a second clock signal which includes an unknown phase delay, said deskew apparatus comprising a tapped delay line connected to receive said first clock signal and comprising a plurality of delay elements each applying a respective delay to said first clock signal and outputting a respective delayed clock signal, selector apparatus for selecting one of the delayed clock signals in response to a control signal, and phase detector apparatus for comparing the phase of the selected delayed clock signal with the phase of said second clock signal and outputting the control signal to control selection of the delayed clock signal having a predetermined phase relationship with the phase of the second clock signal to thereby accommodate for the unknown phase delay.

Preferably said selector apparatus comprises a digital clock deskew apparatus wherein said selector apparatus comprises counter logic for receiving said control signal and having a clock input terminal which receives the selected delayed clock signal to thereby clock the counter, whereby the counter provides a count signal indicating a respective delayed clock signal which is to be selected.

Advantageously said selector apparatus further comprises a multiplexer having a control input connected to receive the count signal from said counter and a plurality of delay inputs each receiving an associated one of said respective delayed clock signals output from the delay elements in said delay line, whereby the multiplexer controls which of said delay inputs is connected to a multiplexer output to thereby output said selected delayed clock signal.

Conveniently said multiplexer further comprises a first input connected to receive said first clock signal and controls which of said first input or said delay inputs is connected to the multiplexer output.

BRIEF DESCRIPTION OF THE DRAWINGS

In the drawings like reference numerals refer to like parts.

DESCRIPTION OF THE PREFERRED EMBODIMENTS

Figure 1:
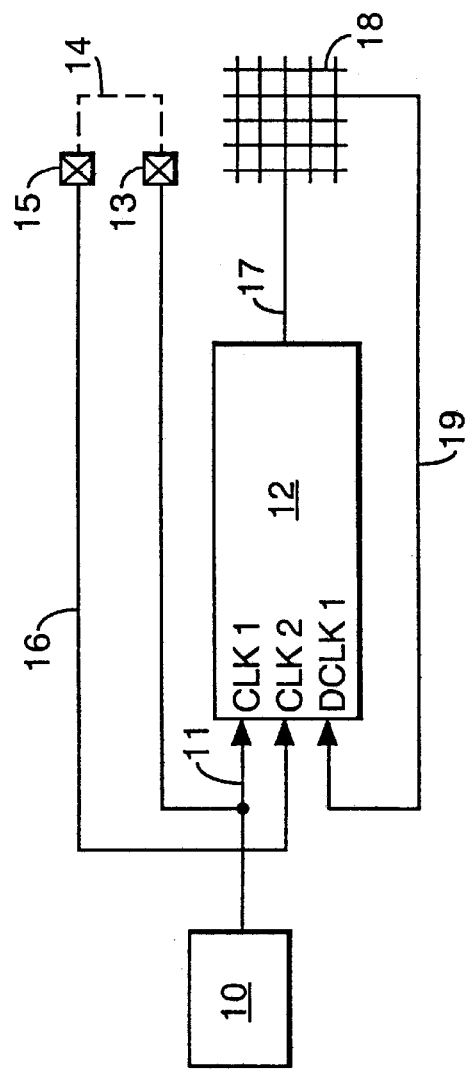
FIG. 1 shows a schematic diagram of a typical circuit application of the present invention.

FIG. 1 shows schematically how the clock deskew apparatus can be typically applied. A clock signal generator 10 which may be provided by a phase locked loop (PLL) is provided on the integrated chip (not shown) to produce an accurate clock signal for use by the on chip circuitry. The output signal CLK1 from the clock signal generator 10 is output on line 11 to a first input of the clock deskew apparatus 12. The output of the clock signal generator is also connected to pad 13 on the chip. External circuitry is shown by the dashed line 14 and is connected between the pad 13 and another on chip pad 15. The external circuitry which includes the input and output pad buffers introduces an unknown delay into the clock signal CLK1 and the thus delayed signal CLK2 is connected from pad 15 via line 16 to a second input to the self-adjusting delay line 12.

The self-adjusting delay line operates to delay the output clock signal CLK1 by an amount equal to the unknown delay provided by the external circuitry thereby deskewing the two clock signals by aligning their phases so as to have a predetermined phase relationship. The deskew apparatus 12 outputs a clock signal DCLK1 on chip via line 17 which is connected to a clock grid 18 which thereby provides clock signals to run internal circuitry applications. The clock signal DCLK1 is fed back from the clock grid 18 via line 19 to provide a third input into the deskew apparatus 12.

In this way on chip circuitry (not shown) which is clocked by a signal taken from the clock grid 18 operates in synchronisation with the external circuitry since the clock signal DCLK1 is a delayed clock signal having a delay provided by the deskew apparatus which exactly or closely matches the unknown delay of the external circuitry.

Figure 2:
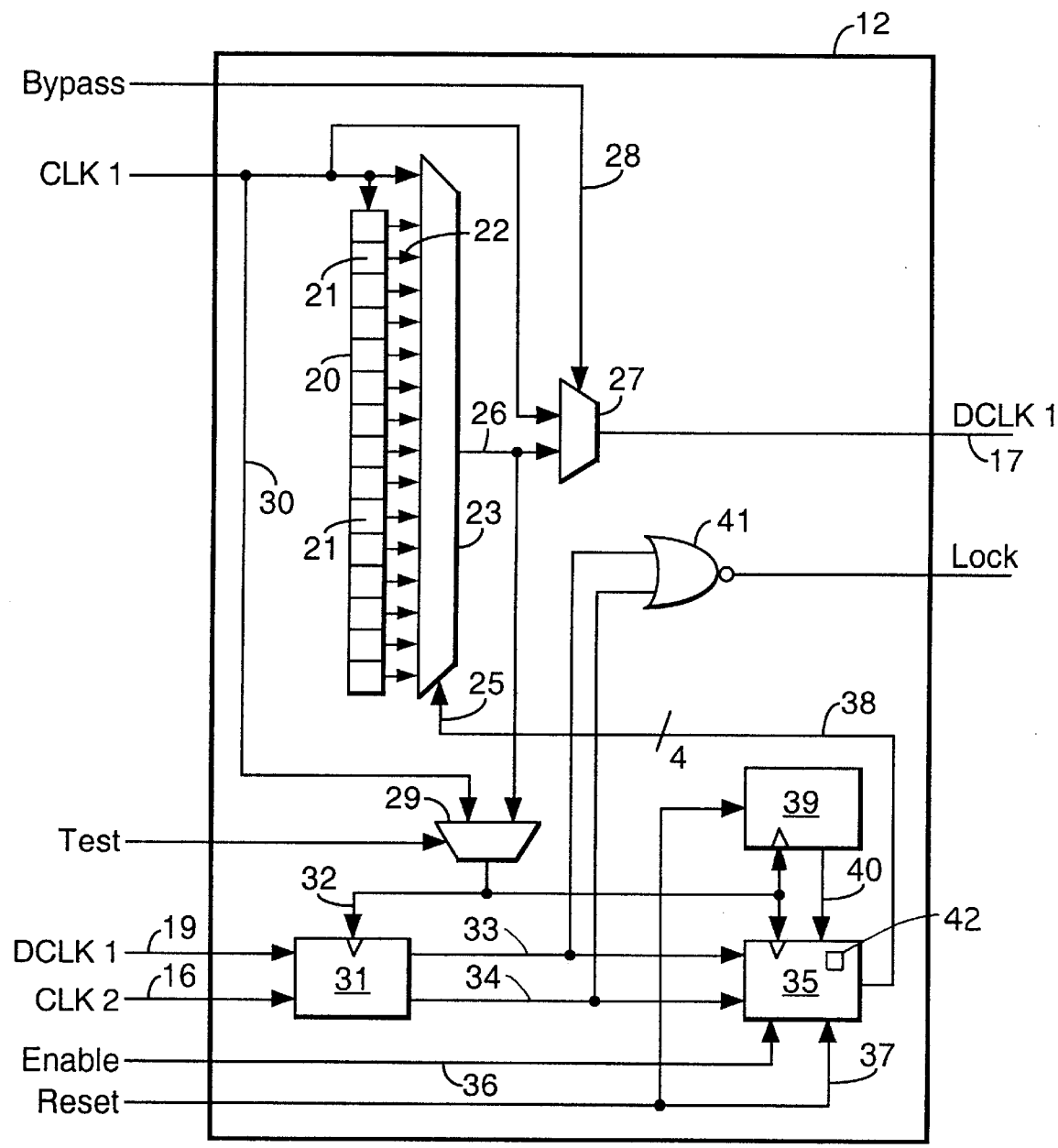
FIG. 2 shows a schematic diagram of the deskew apparatus according to the present invention.

FIG. 2 shows the deskew apparatus 12 in more detail. The clock signal CLK1 from the clock signal generator is input to one end of a tapped delay line 20. The tapped delay line is made up of a plurality of delay elements 21 connected in series. Each of the delay elements provides a delay increment as equal as possible. By tapping one of the delay elements the clock signal can be delayed by a selected amount. Each of the delay elements has an associated tap number to enable the associated element to be selected. Each of the delay elements also provides an output 22, which comprises a respective delayed clock signal, into a multiplexer 23. The multiplexer also receives the undelayed clock signal CLK1 from the on chip clock signal generator. The multiplexer is controlled by a control signal 25 and operates to provide an output via line 26 to a second multiplexer 27. The output of the multiplexer will typically be a delay clock signal output from one of the delay elements 21. If no delay is required to the input signal CLK1, for example during test (when there is no external circuitry connecting pad 13 to pad 15) the multiplexer outputs the input clock signal CLK1 directly without the introduction of any delay.

The second multiplexer 27 also has a second input which receives the input clock signal CLK1. A control input of the multiplexer 27 receives a control signal bypass via line 28 to enable the delay line and multiplexer to be bypassed. The output from the multiplexer 27 provides the output from the deskew apparatus 12 via line 17. Since under normal operating conditions this will be a delayed input clock signal the output is labelled DCLK1 although it will be understood that when the bypass signal is asserted the output DCLK1 will in fact be equal to the input signal CLK1.

The output from the first multiplexer 23 on line 26 also forms an input into a third multiplexer 29. The second input into the third multiplexer is the undelayed clock signal CLK1 from the clock signal generator as provided by line 30. A control signal test controls the third multiplexer so that when a test mode is entered the delay line 20 and first multiplexer 23 is bypassed and the output from the third multiplexer will be the input clock signal CLK1. Under normal operation the test signal will be disabled and the output from the third multiplexer will be the output DCLK1 from the first multiplexer 23 on line 26.

Referring again to FIG. 1 the output line 17 is connected to on chip clock grid 18 and is fed back to the deskew apparatus on line 19. The signal is input into a phase detector 31 as seen in FIG. 2. The clock signal CLK2 including the unknown delay added by the external circuitry is connected to the deskew apparatus via line 16 and is also input into the phase detector 31. The phase detector has a clock input which receives the output from the third multiplexer 29 via line 32. The phase detector operates to output a first control signal CTRL1 on line 33 indicating if the delayed clock signal DCLK1 is faster than the clock signal CLK2 whilst a second control signal CTRL2 is output via line 34 indicating that the delayed clock signal DCLK1 is slower than the clock signal CLK2. Both control signals are input into a counter 35 which is Gray-scale coded.

Figure 3:
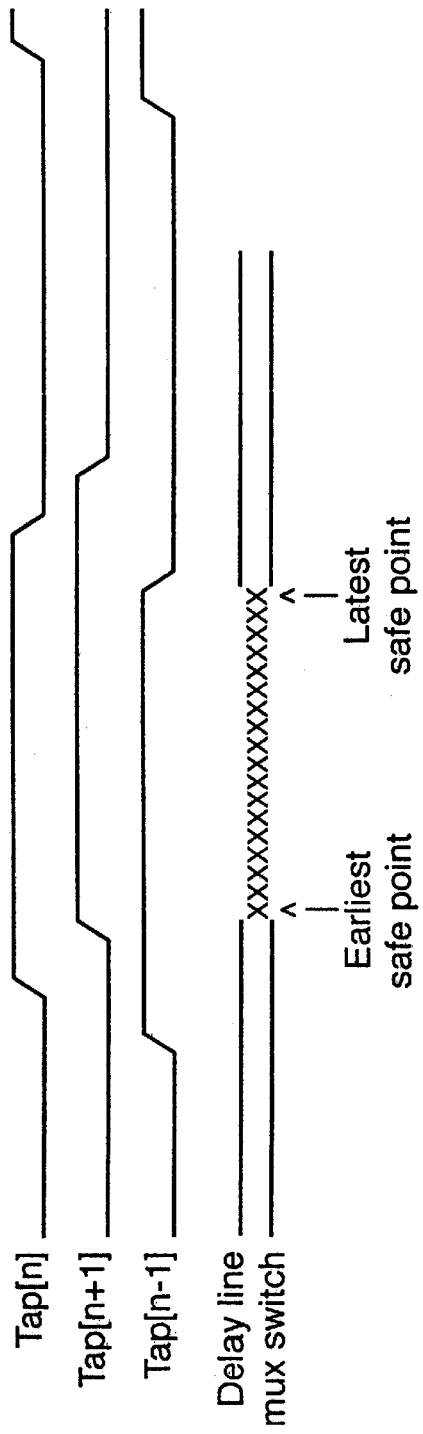
FIG. 3 shows schematically the timing of multiplexer switching signals in accordance with the present invention.

The counter 35 receives the signal DCLK1 output from the multiplexer 29 via line 26 at its clock terminal. The counter logic uses the output of the delay line multiplexer as its clock so that the multiplexer selection changes shortly after a clock rising edge. This is to avoid the possibility of output glitching. This may be seen more clearly in FIG. 3. If an initial delay element has a tap number n tap number n+1 or n−1 can be the next selected. The delay line multiplexer must therefore switch within a period shown between the earliest safe point and latest safe point as indicated to avoid glitches.

The multiplexer comprises an AND-OR array, and is constructed so as to ensure that the previous delay is never deselected before the new delay is selected, which would result in a low-going glitch on the clock output.

The counter also receives an enable signal via line 36. The enable signal can be set so that the delay is continually allowed to adjust or may be clamped at its current value sometime after startup. In this way the state of the selector logic may be frozen inhibiting further changes to the tapped delay selected.

A reset signal is also input to the counter via line 37. The operation of the counter is not reliant upon this reset signal during normal operation. However the reset signal is provided to make the circuit deterministic for simulation and test pattern generation.

Figure 4:
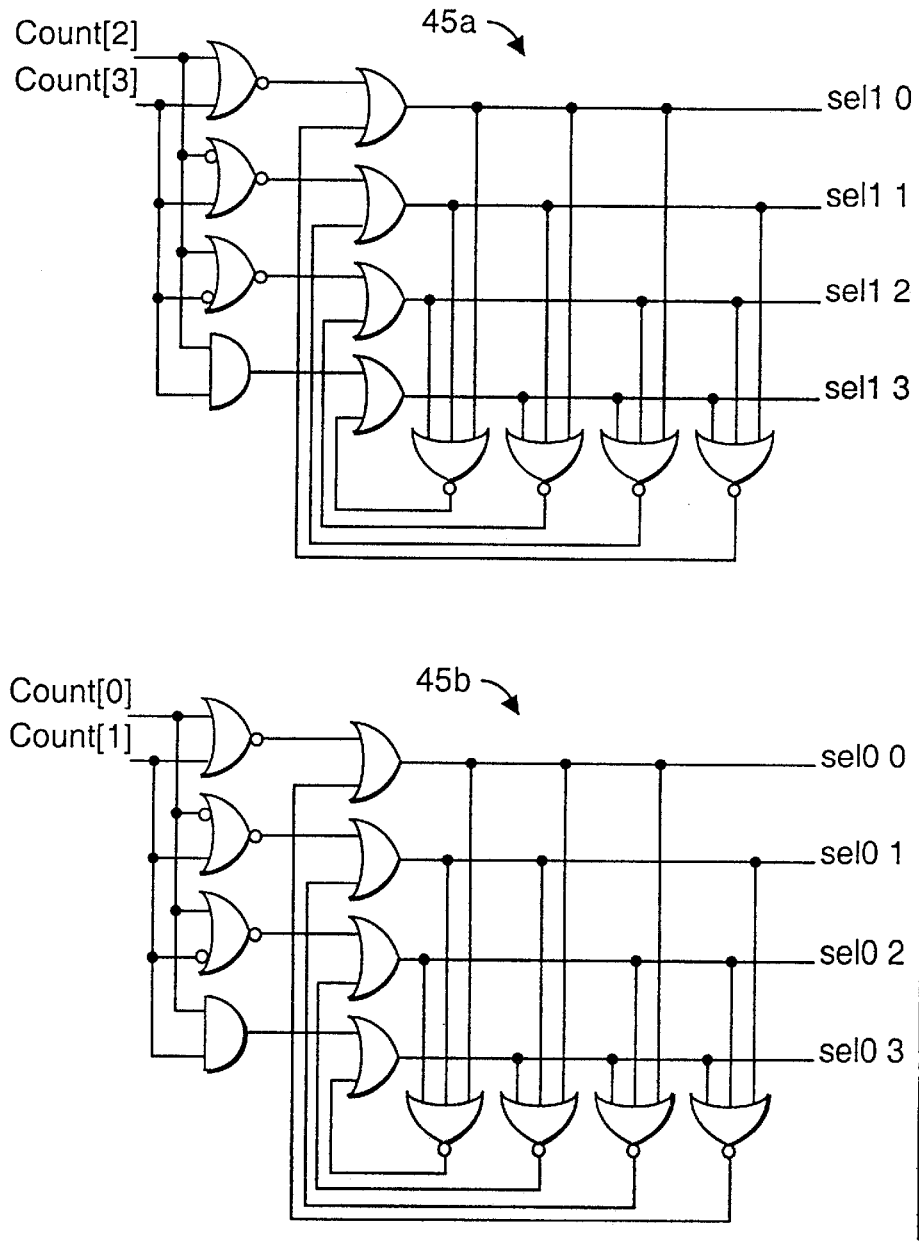
FIG. 4 shows schematically the logic circuitry of a mulitplexer.
Figure 4:
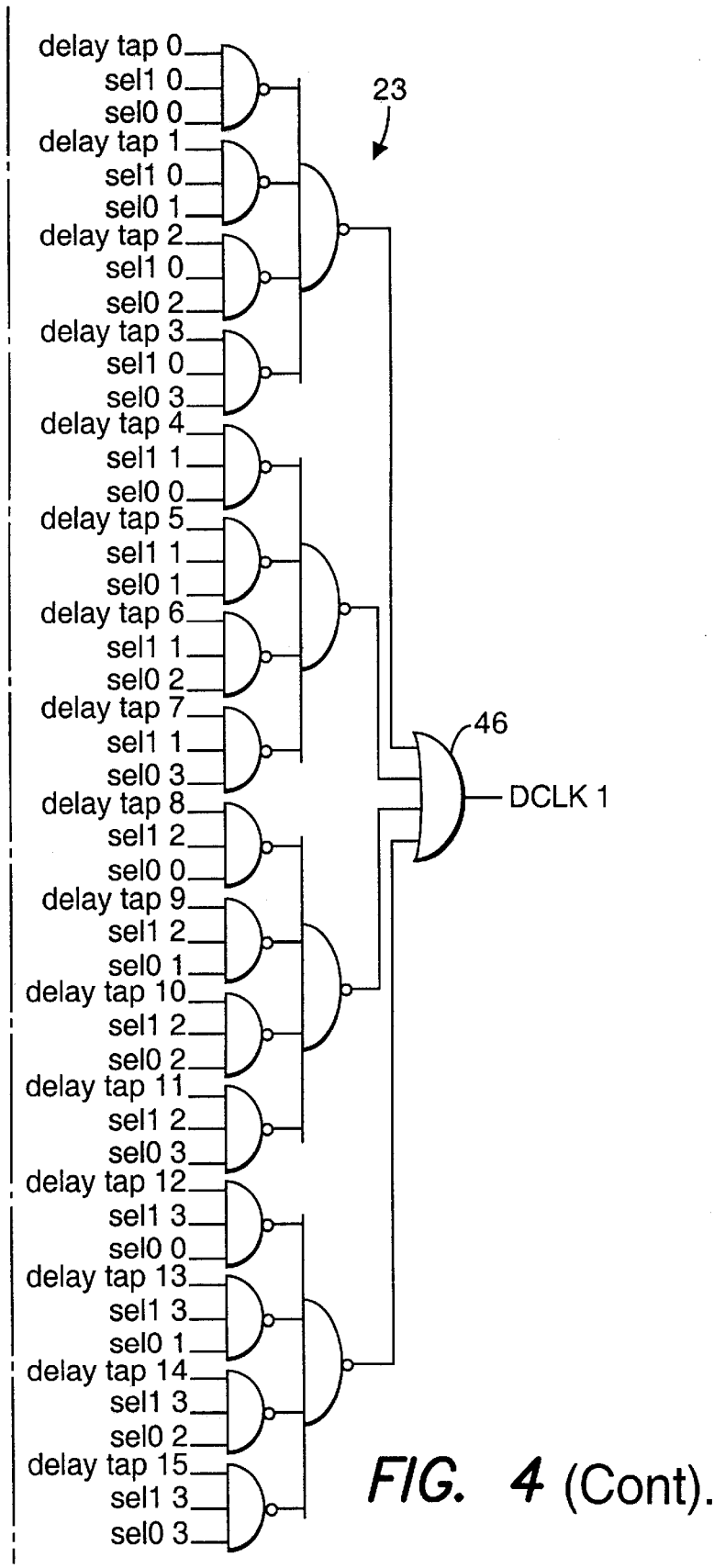

The counter increments or decrements a four bit binary count number which is output on line 38 to control the multiplexer 23 selection. An example of such a multiplexer is shown in FIG. 4 as shown the four bits count[0]–[3] are input into logic circuitry 45a and 45b which generate selection signals sel00–sel13. These selection signals control selection of the outputs from the delay elements delay tap0–15. As may be seen the multiplexer 23 is provided by AND-OR array as is known in the art and provides the delayed clock signal DCLK1 out of the OR gate 46. Thus the binary number corresponds to the tap number of the delay elements 21 in the delay chain 20 and is used to control the multiplexer to select the output from a desired delay element.

Figure 5:
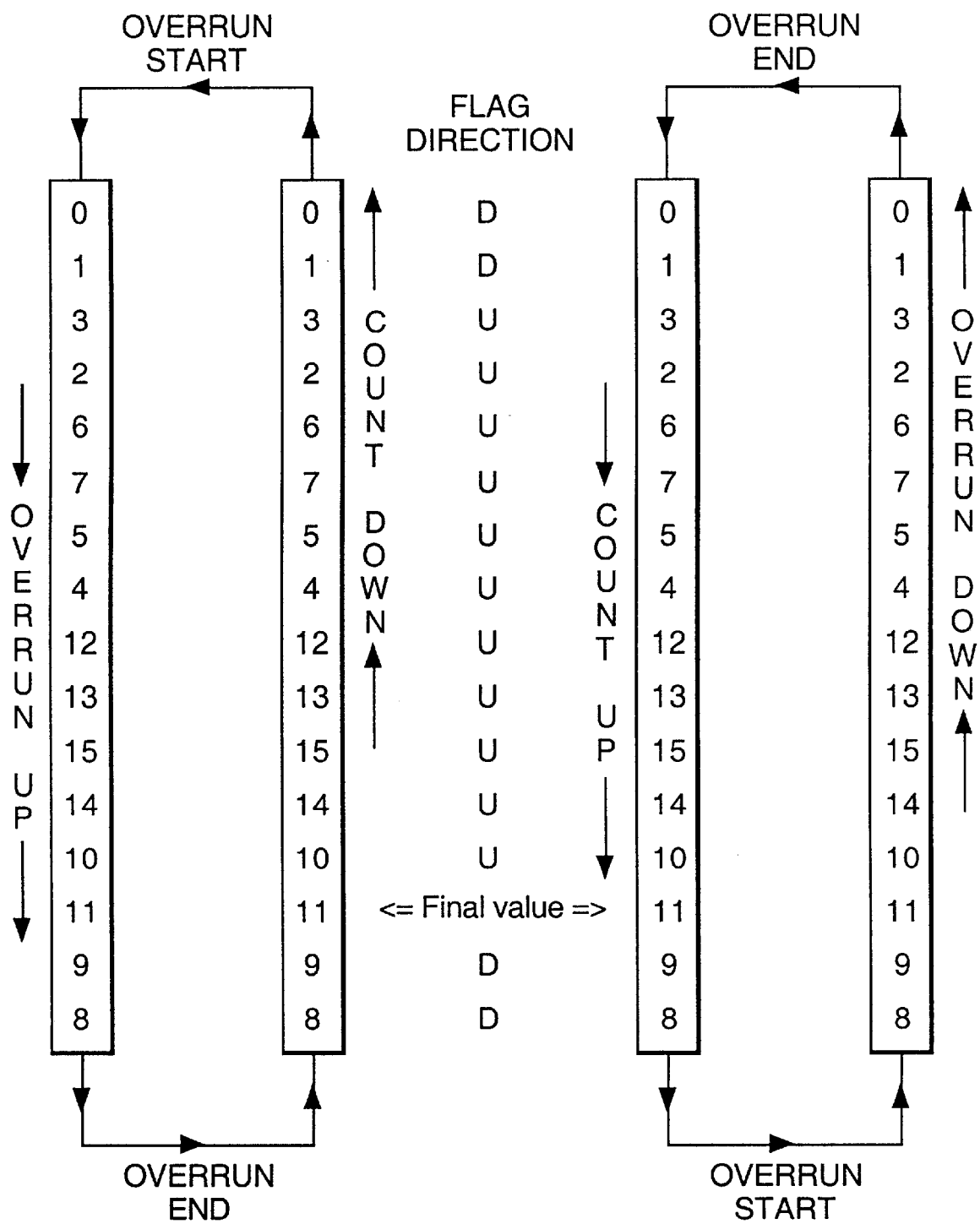
FIG. 5 shows schematically how a counter avoids a roll-over from maximum to minimum value.

The counter is Gray-coded as shown in FIG. 5 so that transitions never occur on more than one bit of the counter output on the same clock cycle which consequently eliminates one possible cause of glitches on the delayed clock signal DCLK1.

The counter state machine is constructed such that its value cannot roll-over from maximum to minimum value, or vice-versa. This is also to prevent glitches on the delayed clock signal DCLK1.

Instead the counter is provided with two overrun flags which cause adjustment to take place irrespective of the direction which the phase detector indicates.

Sometimes the phase relationship of the two reference clocks and the present counter value is such that the output from the phase detector will not cause the reference clocks to converge by the time the counter has reached its maximum or minimum value. This is because the clocks will be in alignment every 360° of phase shift, but the delay line typically has an adjustment range of about 180°. Provided that there is a delay tap which causes alignment of the two reference clocks, and provided that the adjustment range of the delay line is less than 360°, the flags output from the phase detector will always cause convergence from at least one end of the counter's range.

If the counter reaches its maximum value but the phase detector indicates that it should go higher the count needs to resume from the counter minimum value. Flag generation apparatus 42 in the counter therefore sets an overrun-up flag which causes the counter value to step cleanly from maximum to minimum (thereby avoiding glitches on the delay output) irrespective of the output signals from the phase detector. When the minimum value is reached the overrun-up flag is cleared.

Similarly, if the counter reaches its minimum value but the signal from the phase detector indicates that the counter should continue to count down, the count needs to resume from the maximum value. The flag generation apparatus 42 sets the overrun-down flag which causes the counter to step cleanly from minimum to maximum. When the maximum value is reached the overrun-down flag is cleared.

A divide by four divider 39 is preferably provided to enable the counter to count. The enable signal from the divider is output on line 40 into counter 35. The clock input of the divider 39 is the output clock signal from the multiplexer 23. The divider operates so that the counter counts only every fourth clock period to prevent oscillation between adjacent delays caused by the latency of the phase detector 31. The reset signal is also input to the divider to make the circuit deterministic for simulation and test pattern generation.

The control signals CTRL1 and CTRL2 output from the phase detector on lines 33 and 34 respectively also form the inputs into a NOR gate 41 which outputs a lock signal which indicates when the delayed clock signal DCLK1 is in phase with the clock signal CLK2 and is high only when the control signals CTRL1 and CTRL2 are low. This occurs when the phase detector circuit 31 does not assert either the faster or slower flag because the best delay tap corresponding to the delayed clock signal most closely matching the phase of the clock signal CLK2 has already been selected. The asymmetry of the crossover points of the two phase comparators ensures hysteresis approximately equal to the delta between adjacent delay taps. This ensures that there is normally a region when the faster and slower flags are not asserted.

Figure 6:
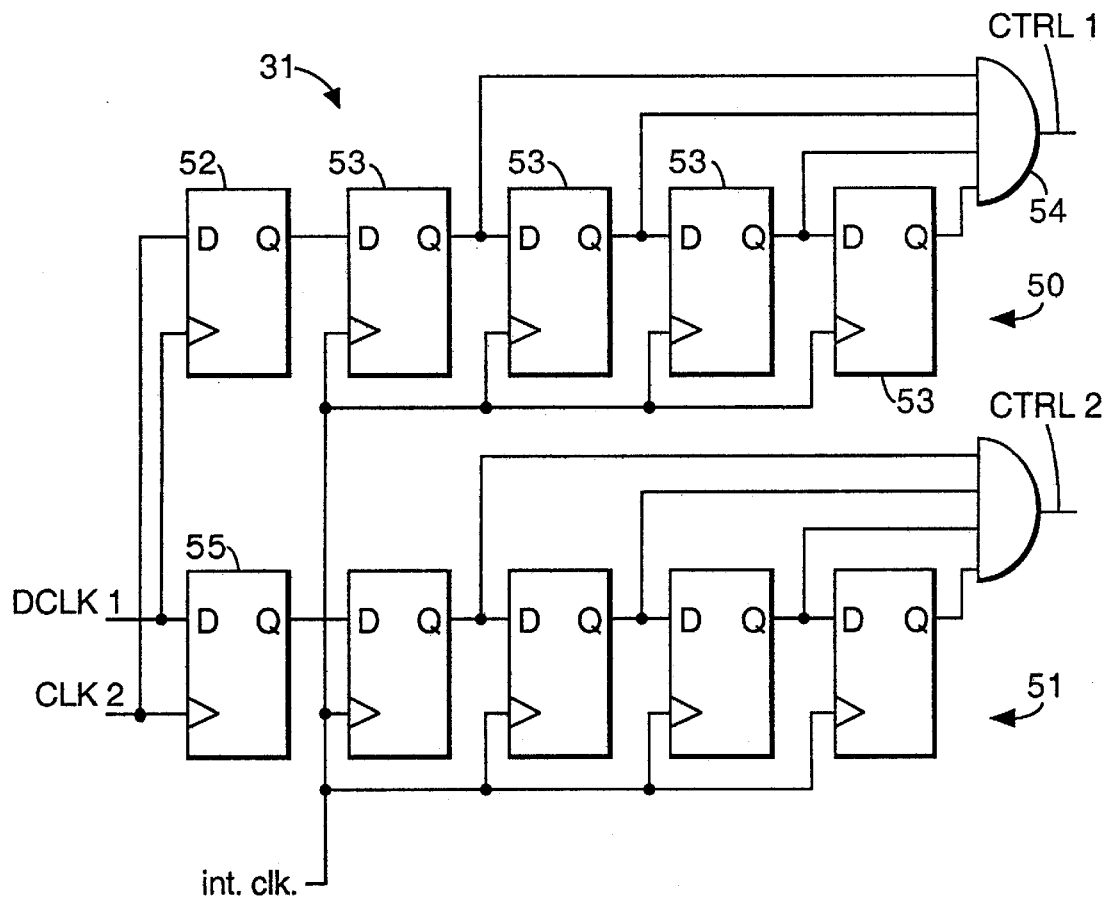
FIG. 6 shows a phase detector circuit in accordance with the present invention.

FIG. 6 shows the phase detector 31 in more detail. The phase detector includes two phase comparators 50 and 51.

The first phase comparator 50 is provided by a first D-type flip flop 52 and a series of D-type flip flops 53. The D-type flip flop 52 receives the clock signal CLK2 at its data input D and the delayed first clock signal DCLK1 output from the multiplexer 23 at its clock input. The output of flip flop 52 is input into the data input of the first D-type flip flop 53 which is clocked by a n internal clock signal int.clk which will typically be the delayed clock signal DCLK1 output from the multiplexer 23.

The output from each of the flip flops 53 is input into an AND gate 54 which outputs control signal CTRL1.

The comparator 50 compares the arrival of the rising edge on one of the clock signals DCLK1 to the arrival of the rising edge on the other clock signal CLK2. If the clock signal CLK2 is found to consistently arrive before the other clock signal DCLK1 then the up-flag control signal CTRL1 is asserted. If the same relationship is detected four times in a row CTRL1 is asserted indicating CLK2 is ahead of DCLK1.

Figure 7:
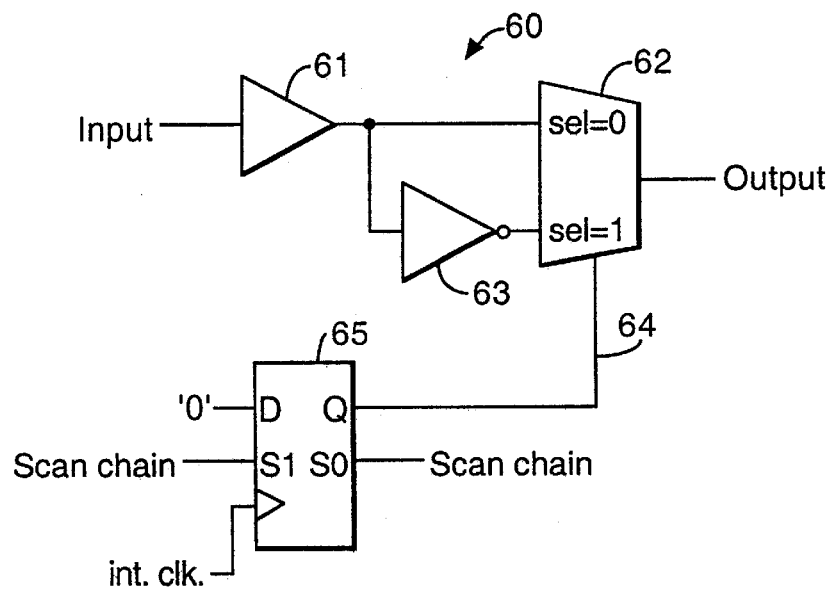
FIG. 7 shows schematically test logic in a delay element.

Comparator 51 operates similarly to comparator 50. However the connections of the two clock signals DCLK1 and CLK2 are reversed in the first D-type flip flop 55 so that the down-flag control signal CTRL2 is asserted when the rising edge of the clock signal DCLKI is In order to allow the deskew apparatus 12 to support full scan testing the delay chain and multiplexer 23 should be modified since they are inherently untestable because all paths therethrough are functionally equivalent. Therefore each delay element is modified as shown in FIG. 7 which shows the delay element test logic 60.

The input signal input into the test logic 60 is provided from the previous delay element and is connected to buffer 61. The output from buffer 61 provides a first input into multiplexer 62. The output signal output from the multiplexer provides the test logic output which may provide the input into the next delay element. The output from the buffer 61 is inverted by inverter 63 which provides a second input into the multiplexer 62. The multiplexer selection is controlled via a signal on line 64 output from D-type flip-flop 65. The flip-flop 65 is clocked by the internal clock signal int.clk. and has its data input connected to receive a low signal. By controlling the scan chain signals during test mode the multiplexer 62 can be controlled to allow the delay elements to be individually made inverting or non-inverting under the control of full-scan test vectors. Such vectors can therefore be generated which can differentiate between any two paths through the delay line 20 and multiplexer 23 on account of whether the output is inverted or not. In this way the test logic enables the scan vectors to gain test coverage of the delay line.

It will be understood by those skilled in the art that the above description is not limited to the specific examples described.

Also although a preferred embodiment of the invention has been described, it will be understood that the invention is not to be limited to what has been described. Rather the invention extends to the full scope of the appended claims.

What is claimed is:

1. Digital clock deskew apparatus for synchronising a phase of a first clock signal, with a phase of a second clock signal which includes an unknown phase delay, said deskew apparatus comprising:

a tapped delay line connected to receive said first clock signal and comprising a plurality of delay elements each applying a respective delay to said first clock signal and outputting a respective delayed clock signal;

selector apparatus for selecting one of the respective delayed clock signals in response to a count signal;

phase detector apparatus for comparing a phase of the selected delayed clock signal with the phase of said second clock signal and outputting control signals to control selection of the delayed clock signal having a predetermined phase relationship with the phase of said second clock signal to thereby accommodate for the unknown phase delay; and a counter for receiving said control signals and having a clock input terminal which receives the selected delayed clock signal to thereby clock the counter; whereby the counter provides the count signal indicating the respective delayed clock signal which is to be selected.

2. Digital clock deskew apparatus according to claim 1 wherein said selector apparatus comprises a multiplexer having a control input connected to receive the count signal from said counter and a plurality of delay inputs each receiving an associated one of said respective delayed clock signals output from the delay elements in said delay line; whereby the multiplexer controls which of said delay inputs is connected to the multiplexer output to thereby output said selected delayed clock signal.

3. Digital clock deskew apparatus according to claim 2 wherein said multiplexer further comprises a first input connected to receive said first clock signal and controls which of said first input or said delay inputs is connected to the multiplexer output.

4. Digital clock deskew apparatus according to claim 1 wherein each delay element has an associated tap number by which the delay element and its respective delayed clock signal is selectable and wherein said selector apparatus selects a tap number to thereby select the respective delayed clock signal associated with that tap number.

5. Digital clock deskew apparatus according to claim 4 wherein said counter comprises a Gray-code counter which increments or decrements the tap number according to a Gray scale code.

6. Digital clock deskew apparatus according to claim 1 wherein said phase detector comprises:

first and second phase comparators each having a first and second input connected to receive said selected delayed clock signal and said second clock signal; wherein said first comparator provides a first control signal of said control signals indicating that said selected delayed clock signal is faster than said second clock signal and said second comparator provides a second control signal of said control signals indicating that said selected delayed clock signal is slower than said second clock signal.

7. Digital clock deskew apparatus according to claim 6 wherein said first phase comparator comprises:

a first D-type flip flop having a clock input connected to receive said selected delayed clock signal and a data input connected to receive said second clock signal;

a first plurality of D-type flip flops connected in series each having a clock input connected to receive an internal clock signal, a first D-type flip-flop of the series being connected to an output of the first p-type flip-flop; and first control logic circuitry connected to receive an output from each D-type flip flop in said series and having an output which provides said first control signal.

8. Digital clock deskew apparatus according to claim 6 wherein said second phase comparator comprises:

a second D-type flip flop having a clock input connected to receive said second clock signal and a data input connected to receive said selected delayed clock signal;

a second plurality of D-type flip flops connected in series each having a clock input connected to receive an internal clock signal, a first D-type flip-flop of the series being connected to an output of the second D-type flip-flop; and second control logic circuitry connected to receive an output from each D-type flip flop in said series and having an output which provides said second control signal.

9. Digital clock deskew apparatus according to claim 7 wherein said first control logic circuitry comprises an and gate and outputs said first control signal indicating that the selected delayed clock signal is faster than said second clock signal when the output of each of said first plurality of D-flip flops is high.

10. Digital clock deskew apparatus according to claim 8 wherein said second control logic circuitry comprises an and gate and outputs said second control signal indicating said selected delayed clock signal is slower than said second clock signal when the output of each of said second plurality of D-flip flops is high.

11. Digital clock deskew apparatus according to claim 6 further comprising:

logic circuitry having a first input connected to receive said first control signal and a second input connected to receive said second control signal and an output; wherein said logic circuitry output provides a lock signal when said selected delayed clock signal is in phase with said second clock signal.

12. Digital clock deskew apparatus according to claim 4 further comprising:

enabling means having an input connected to receive said selected delayed clock signal and an output which provides an enable signal at predetermined intervals to enable selection of said tap number.

13. Digital clock deskew apparatus according to claim 1 wherein said counter comprises selection inhibiting apparatus connected to receive a signal for inhibiting further selection of a delay element.

14. Digital clock deskew apparatus according to claim 1 wherein each delay element further comprises test logic for enabling a scan vector to gain test coverage of the delay line.

15. Digital clock deskew apparatus according to claim 1 wherein said counter further comprises overrun flag generation apparatus for preventing roll-over of the counter value from maximum to minimum or from minimum to maximum.

16. Digital clock deskew apparatus according to claim 15 wherein said overrun flag generation apparatus controls the counter value to step the count signal irrespective of said control signals.

* * * * *

UNITED STATES PATENT AND TRADEMARK OFFICE
CERTIFICATE OF CORRECTION

| | |
|---|---|
| PATENT NO. | : 6,320,436 B1 |
| DATED | : November 20, 2001 |
| INVENTOR(S) | : Adrian Fawcett and Jeremy Whaley |

It is certified that error appears in the above-identified patent and that said Letters Patent is hereby corrected as shown below:

<u>Column 5,</u>
Line 49 should read as follows:
-- edge of the clock signal DCLK1 is consistently ahead of CLK2. --

Signed and Sealed this

Sixteenth Day of April, 2002

*Attest:*

JAMES E. ROGAN
*Attesting Officer*          *Director of the United States Patent and Trademark Office*